June 21, 1955 T. V. ECKLES 2,711,258
SPARE TIRE CARRIERS FOR TRUCKS
Filed Feb. 16, 1953
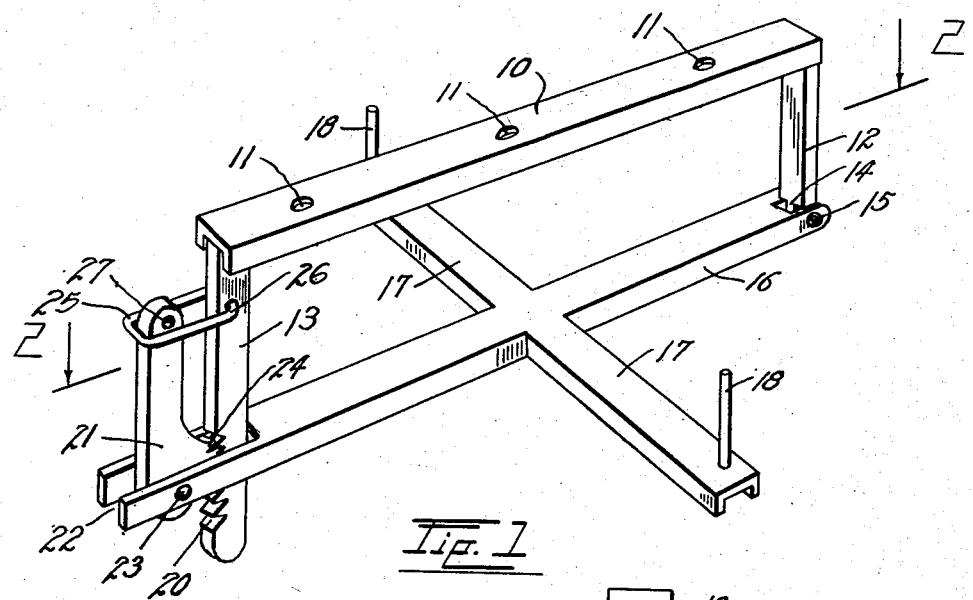
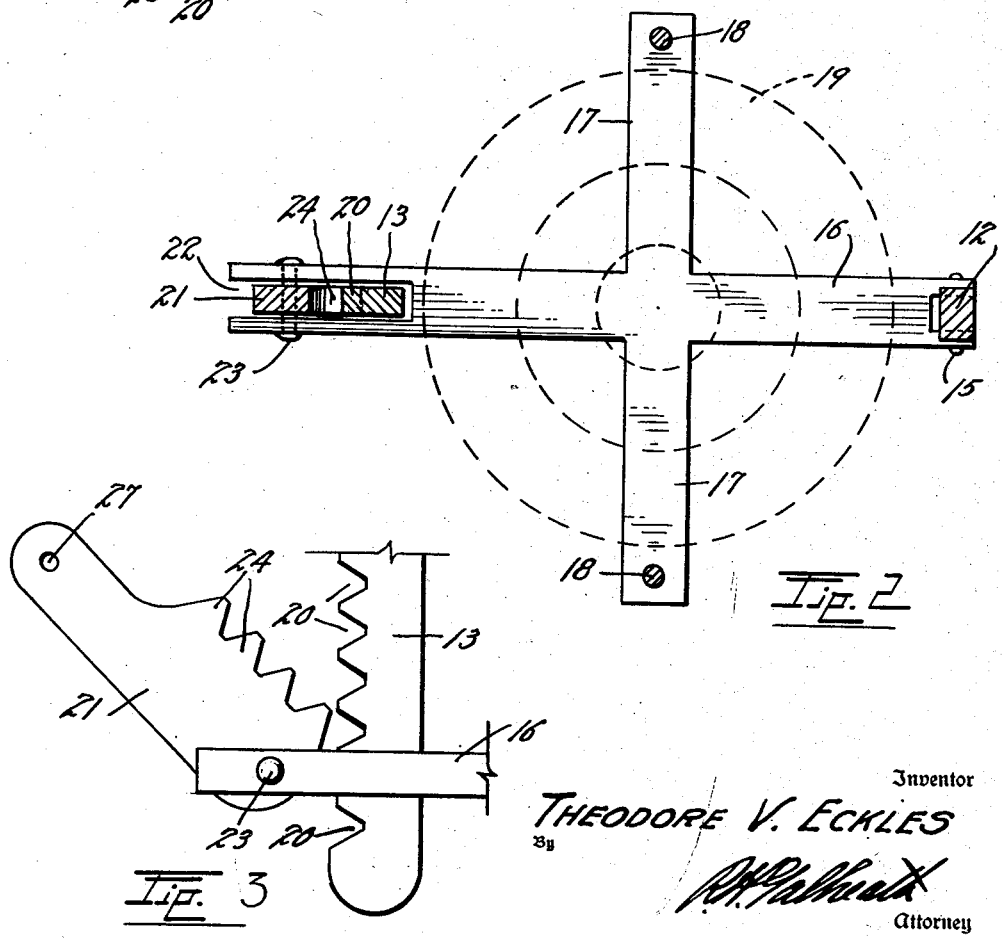
Inventor
THEODORE V. ECKLES
Attorney

United States Patent Office 2,711,258
Patented June 21, 1955

2,711,258

SPARE TIRE CARRIERS FOR TRUCKS

Theodore V. Eckles, Monte Vista, Colo.

Application February 16, 1953, Serial No. 336,928

5 Claims. (Cl. 214—454)

This invention relates to a spare wheel carrier for automotive vehicles, more particularly for use on small trucks of the "pick-up" type, and has for its principal object the provision of a highly efficient device for carrying a spare wheel or spare tire on a "pick-up" truck.

Another object of the invention is to so construct the carrier that it will not be affected by road sand, dirt, and moisture, and will not become rusted or locked in place so that the spare wheel can be quickly and easily removed when required.

A further object is to so construct the device that it will be adjustable for holding wheels and tires of different sizes and so that it will not rattle under the vibration of the truck.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side view of the improved spare wheel carrier, illustrating it in the closed position;

Fig. 2 is a horizontal section, looking downwardly on the line 2—2, Fig. 1; and

Fig. 3 is an enlarged detail view, illustrating a type of latch employed with the carrier.

The improved spare wheel carrier is preferably mounted on a base bar 10 which may be attached beneath the bed or body of an automotive vehicle in any suitable manner, such as by means of attachment bolts inserted through bolt holes 11. The bar 10 is attached to the body beneath the floor so as to extend longitudinally of the axis of the vehicle adjacent the rear thereof.

A front post 12 is rigidly attached to and extends downwardly from the forward extremity of the bar 10, and a rear post 13 is similarly attached to and extends downwardly from the rear extremity of the bar 10. The lower extremity of the front post 12 is formed with a hinge tongue 14 through which a hinge pin 15 passes. The pin 15 hingedly mounts a longitudinal carrier member 16 on the post 12. The rear extremity of the longitudinal carrier member 16 is slotted, as shown at 22, to pass on both sides of the rear post 13.

A cross carrier member 17 is permanently affixed to the carrier member 16 and extends oppositely outward therefrom adjacent the medial portion thereof. The cross carrier member 17 is preferably provided with upwardly extending retaining studs 18 to maintain a wheel, such as indicated at 19, in place on the carrier members.

The vertical rear edge of the rear post 13 is provided with a plurality of spaced ratchet notches 20. A rotatable latch member 21 is mounted on a pivot pin 23 in the slot 22 of the carrier member 16 rearwardly of the position of the rear post 13.

The latch member 21 is provided with eccentrically positioned, post-engaging teeth 24 which are adapted to engage in the notches 20 of the post 13 when the latch member is swung upwardly to the vertical position of Fig. 1.

A locking ring 25 is hinged to the post 13, as indicated at 26, so that it may be dropped over the upper extremity of the latch member 21 to retain the latter in place. A lock opening 27 is provided through which a padlock or other locking device may be passed to prevent releasing of the ring 25.

To receive a spare wheel, the rear extremity of the carrier member is dropped and the wheel is positioned thereon between the retaining studs 18. The rear extremity of the carrier member 16 is then lifted and pulled upwardly on the post 13 as far as possible. The latch member 21 is then swung upwardly and forwardly. This will bring the teeth 24 into the notches 20, causing the latch member to act as a prying lever, with the notches as the fulcrum, to still further draw the carrier member upwardly so as to tightly squeeze the wheel tire casing between the bar 10 and the carrier members 16 and 17. The ring 25 is then dropped over the latch member to retain it in place.

To release the wheel, it is only necessary to lift the ring 25 and swing the latch member downwardly. The lever action of the latch member will quickly break loose any rust or other material tending to hold the carrier in the elevated position.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A spare wheel carrier for an automotive vehicle comprising: a downwardly-extending front post; a downwardly-extending rear post, said posts being rigidly secured at their upper extremities to said vehicle; a longitudinal carrier member hingedly mounted at its forward extremity on said front post, the rear extremity of said carrier member being provided with a longitudinally extending slot receiving said rear post; a latch member pivotally mounted in said slot rearwardly of said rear post and positioned to swing into engagement with said rear post to latch said carrier member thereto; teeth formed in the rear face of said rear post; a horizontal pivot pin extending across said slot rearwardly of said post, said latch member being pivotally mounted on said pin so as to swing in the vertical longitudinal plane of said longitudinal carrier member; and teeth formed in said latch member adapted to engage the teeth formed in the rear face of said rear post when said latch member is rotated on said pin.

2. A spare wheel carrier as described in claim 1 having means for locking said latch member against rotation when said teeth are in engagement.

3. A spare wheel carrier as described in claim 2 in which the means for locking said latch member comprises a ring rotatably mounted on said rear post and positioned to swing over the extremity of said latch member to prevent rotation thereof.

4. A spare wheel carrier as described in claim 3 in which said latch member is provided with an opening to receive a locking device, said opening being positioned so that a locking device positioned therein will prevent said ring from being swung from said latch member.

5. A spare wheel carrier for an automotive vehicle comprising: a downwardly-extending front post; a downwardly-extending rear post, said posts being rigidly secured at their upper extremities to said vehicle, said rear post being provided with a plurality of spaced ratchet notches; a longitudinal carrier member hingedly mounted at its forward extremity on said front post; a cross carrier member extending oppositely outward from the sides of said longitudinal carrier member; retaining means extending upwardly from adjacent the extremities of said cross carrier member to retain a wheel thereon; and a latch member provided with post-engaging teeth pivotally mounted adjacent the rear extremity of said longitudinal carrier and positioned so that, when its rearward extremity is swung upwardly, the post-engaging teeth thereon will engage the spaced ratchet notches of said rear post to pry said longitudinal carrier member upwardly thereon.

References Cited in the file of this patent

UNITED STATES PATENTS

| | | |
|---|---|---|
| 1,338,755 | Strid | May 4, 1920 |
| 1,641,890 | Jackson | Sept. 6, 1927 |
| 1,672,356 | Wasserfallen | June 5, 1928 |
| 1,761,916 | Hebner | June 3, 1930 |
| 1,797,222 | Alborn et al. | Mar. 24, 1931 |
| 1,913,835 | Golike | June 13, 1933 |
| 2,645,394 | De Bord | July 14, 1953 |

FOREIGN PATENTS

| | | |
|---|---|---|
| 364,339 | Great Britain | Jan. 7, 1932 |